United States Patent
Jeong et al.

(10) Patent No.: US 10,038,185 B2
(45) Date of Patent: Jul. 31, 2018

(54) SECONDARY BATTERY

(71) Applicant: Samsung SDI Co., Ltd., Yongin-si, Gyeonggi-do (KR)

(72) Inventors: Changui Jeong, Yongin-si (KR); Sora Lee, Yongin-si (KR); Changsu Shin, Yongin-si (KR); Hyeri Eom, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 270 days.

(21) Appl. No.: 14/936,560

(22) Filed: Nov. 9, 2015

(65) Prior Publication Data
US 2016/0197343 A1    Jul. 7, 2016

(30) Foreign Application Priority Data
Jan. 7, 2015   (KR) .................. 10-2015-0002027

(51) Int. Cl.
    *H01M 4/38*    (2006.01)
    *H01M 4/36*    (2006.01)
    (Continued)

(52) U.S. Cl.
    CPC ............ *H01M 4/386* (2013.01); *C22C 24/00* (2013.01); *C22C 45/00* (2013.01); *H01M 4/366* (2013.01); *H01M 4/505* (2013.01); *H01M 4/525* (2013.01); *H01M 4/625* (2013.01); *H01M 10/052* (2013.01); *Y02T 10/7011* (2013.01)

(58) Field of Classification Search
CPC ...... H01M 4/366; H01M 4/505; H01M 4/525; H01M 4/625; H01M 4/386
See application file for complete search history.

(56) References Cited

U.S. PATENT DOCUMENTS

2007/0128517 A1 *  6/2007  Christensen .......... H01M 4/134
                                                          429/218.1
2009/0162751 A1 *  6/2009  Honbo .................. H01M 4/131
                                                          429/223
(Continued)

FOREIGN PATENT DOCUMENTS

JP    2001-196064    *  7/2001  .............. H01M 4/58
JP    2004-349056    *  12/2004
(Continued)

OTHER PUBLICATIONS

Lee et al., Graphite—FeSi Alloy composites as anode materials for rechargeable lithium ion batteries, Journal of Power Sources 112(2002) 649-654.*
(Continued)

*Primary Examiner* — Oi K Conley
(74) *Attorney, Agent, or Firm* — Knobbe, Martens, Olson & Bear, LLP

(57) ABSTRACT

Disclosed is a secondary battery including a negative electrode, a positive electrode, and an electrolyte between the negative electrode and the positive electrode, wherein the negative electrode includes a negative electrode active material including: an Si—Fe based alloy core; a carbonaceous first coating layer disposed on the core; and a second coating layer which is disposed on the first coating layer and includes carbon nanotubes (CNTs) having an average length of about 1.0 nm to about 2.0 μm.

16 Claims, 13 Drawing Sheets

(51) Int. Cl.
*H01M 4/505* (2010.01)
*H01M 4/525* (2010.01)
*H01M 4/62* (2006.01)
*H01M 10/052* (2010.01)
*C22C 24/00* (2006.01)
*C22C 45/00* (2006.01)

(56) References Cited

U.S. PATENT DOCUMENTS

2010/0075226 A1* 3/2010 Pham .................. H01M 4/134
429/219
2010/0092868 A1 4/2010 Kim et al.

FOREIGN PATENT DOCUMENTS

| JP | 2010-95797 A | 4/2010 |
|----|--------------|--------|
| JP | 5500047 B2 | 3/2014 |

OTHER PUBLICATIONS

Bakshi et al., "Carbon nanotube reinforced aluminum composite coating via cold spraying," *Surface & Coatings Technology* 202 (2008) 5162-5169.

* cited by examiner

200
SECONDARY BATTERY

RELATED APPLICATION

Any and all applications for which a foreign or domestic priority claim is identified in the Application Data Sheet as filed with the present application are hereby incorporated by reference under 37 CFR 1.57. This application claims the benefit of Korean Patent Application No. 10-2015-0002027, filed on Jan. 7, 2015, in the Korean Intellectual Property Office, the disclosure of which is incorporated herein in its entirety by reference.

BACKGROUND

Field

The present disclosure relates to a secondary battery.

Description of the Related Technology

Demand in secondary batteries used in electric vehicles, electric bicycles, and portable electric devices for information and communication such as Personal Digital Assistants (PDAs), cellular phones, and laptop computers is increasing rapidly. Lithium batteries, specifically, lithium secondary batteries are adopted as power sources for electric vehicles or power storage as well as for portable information technology (IT) devices, etc due to their high energy density and easy designs. Such lithium secondary batteries are required to have high energy densities or/and long lifetime characteristics.

Carbonaceous negative electrode active materials such as graphite are mainly used as negative electrode active materials of the lithium secondary batteries. The carbonaceous negative electrode active materials such as graphite have theoretical discharge capacities of about 360 mAh/g.

Therefore, secondary batteries including negative electrodes including negative electrode active materials which have higher capacities than graphite and have improved electronic conductivity and lifetime characteristics are required.

SUMMARY

Provided are secondary batteries with improved electronic conductivity and lifetime characteristics.

Additional aspects will be set forth in part in the description which follows and, in part, will be apparent from the description, or may be learned by practice of the presented embodiments.

According to an aspect of an exemplary embodiments, a secondary battery includes a negative electrode, a positive electrode, and an electrolyte between the negative electrode and the positive electrode, wherein the negative electrode includes a negative electrode active material including: an Si—Fe based alloy core; an amorphous carbonaceous first coating layer disposed on the core; and a second coating layer which is disposed on the first coating layer and includes carbon nanotubes (CNTs) having an average length of about 1.0 nm to about 2.0 μm.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
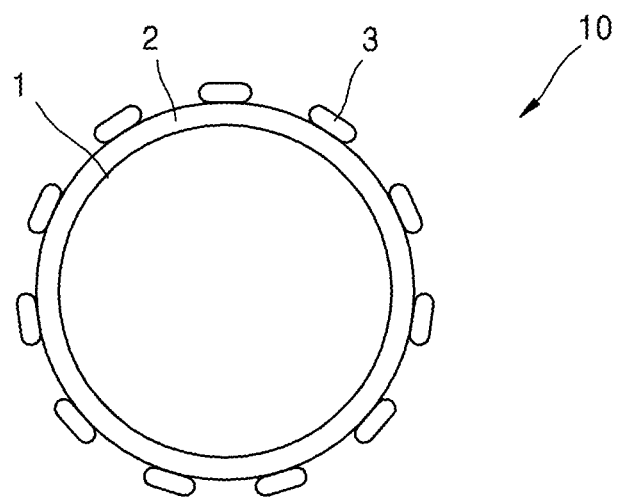
FIG. 1 is a schematic diagram showing a negative electrode active material according to one or more exemplary embodiments.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

According to one or more exemplary embodiments, a secondary battery includes a negative electrode, a positive electrode, and an electrolyte between the negative electrode and the positive electrode, wherein the negative electrode includes a negative electrode active material including: an Si—Fe based alloy core; an amorphous carbonaceous first coating layer disposed on the core; and a second coating layer which is disposed on the first coating layer and includes carbon nanotubes (CNTs) having an average length of about 1.0 nm to about 2.0 μm.

FIG. 1 is a schematic diagram showing a negative electrode active material according to one or more exemplary embodiments.

A secondary battery according to one or more exemplary embodiments may provide a secondary battery with improved electronic conductivity and lifetime characteristics by including the amorphous carbonaceous first coating layer 2 disposed on the Si—Fe based alloy core 1, and the second coating layer 3 which is disposed on the first coating layer 2 and includes carbon nanotubes (CNTs) having an average length of about 1.0 nm to about 2.0 μm, thereby obtaining excellent mechanical stabilities with respect to volume changes even during the repeated charging and discharging process of the secondary batteries.

The carbon nanotubes have characteristics of non-reacting with an electrolyte, and the carbon nanotubes may include single-walled carbon nanotubes, multi-walled carbon nanotubes, or combinations thereof.

The carbon nanotubes may have an average diameter range of about 1.0 nm to about 30 nm, about 5.0 nm to about 20 nm, or about 10 nm to about 15 nm.

The carbon nanotubes are uniformly disposed on the amorphous carbonaceous first coating layer 2 within the average diameter range to further improve electronic conductivity of a secondary battery including the carbon nanotubes.

The carbon nanotubes may have an average length range of about 1.0 nm to about 2.0 μm, about 10 nm to about 2.0 μm, about 50 nm to about 2.0 μm, or about 100 nm to about 2.0 μm. When the carbon nanotubes are within the average length range, the secondary battery may have further improved electronic conductivity and lifetime characteristics at high rates of 3C and/or 7C or higher rates by including a second coating layer 3 including carbon nanotubes (CNTs) with a uniform average length on the amorphous carbonaceous first coating layer 2, thereby maintaining mechanical properties of the secondary battery to be more stable with respect to volume expansions of the secondary battery even during a continuous charging and discharging process.

The carbon nanotubes may be contained in a range of about 0.1 parts by weight to about 5.0 parts by weight or about 1.0 part by weight to about 5.0 parts by weight with respect to 100 parts by weight of the negative electrode active material. When the carbon nanotubes are contained within the amount range, the secondary battery may have maximum electronic conductivity and lifetime characteristics at high rates of 3C and/or 7C or higher rates.

The second coating layer including the carbon nanotubes (CNTs) may be a dry coating layer or a wet coating layer.

For instance, the second coating layer including the carbon nanotubes (CNTs) may be a wet coating layer. Although the wet coating layer may be formed using coating methods such as screen printing, spray coating, dip coating, doctor blade coating, etc., the coating methods are not limited thereto, and all wet coating layer-forming methods usable in the art may be used as the coating methods. When the second coating layer is the wet coating layer, the second coating layer may form a coating layer with a uniform thickness on the first coating layer compared to the dry coating layer.

The amorphous carbonaceous first coating layer may be contained in a range of about 0.1 parts by weight to about 5.0 parts by weight, about 1.0 part by weight to about 5.0 parts by weight, or about 1.0 part by weight to about 3.0 parts by weight with respect to 100 parts by weight of the negative electrode active material. A negative electrode active material including the amorphous carbonaceous first coating layer contained in the amount range further inhibit the formation of a SEI (Solid Electrolyte Interphase) film due to the reaction with an electrolyte during initial charging along with the second coating layer such that electronic conductivity of the negative electrode active material may maintained more excellent.

The Si—Fe based alloy core may include a Si—Fe based alloy represented by Formula 1:

$$Si_x\text{—}Fe_y\text{-}M_z \quad \text{[FORMULA 1]}$$

wherein 50≤x≤90, 5≤y≤30, 5≤z≤30, x+y+z=100; and M may be one or more selected from C, Al, Ti, Cr, Mn, Co, Ni, Mg, Cu, S, Se, Te, Sn, In, Ga, Ge, As, Pb, Pd, Bi, Zn, W, and Ag. For example, M may be one or more selected from C, Al, Ti, Cr, Mn, Co, Ni, Mg, Cu, S, Se, Te, and Sn. For example, M may be one or more selected from C, Al, Ti, Cr, Mn, Co, Ni, Mg, and Cu.

The Si—Fe based alloy core is formed in the form of powder, and the Si—Fe based alloy core may have a particle size distribution in which a D50 value of the powder is about 0.3 μm to about 20 μm, about 1 μm to about 20 μm, or about 1 μm to about 10 μm. Here, the "D50 value" means particle diameter values of the smallest powder particles to powder particles corresponding to 50% when the total powder particle number is 100% on a distribution curve in which powder particle sizes are cumulated in the order from the smallest powder particle to the largest powder particle. The D50 value may be measured by methods that are well known to those of ordinary skill in the art. For example, the D50 value may be measured by a particle size analyzer, or may also be measured from Transmission Electron Microscope (TEM) photographs or Scanning Electron Microscope (SEM) photographs. Alternatively, after measuring the D50 value by a measuring device using dynamic light scattering and performing the data analysis to count numbers of powder particles for respective powder particle size ranges, the D50 value may be easily obtained through the calculation from the counted numbers of the powder particles.

The Si—Fe based alloy core powder may have an electronic conductivity of about 0.20 S/cm to about 3.0 S/cm at a powder density of about 2.1 g/cc to about 2.5 g/cc. Electronic conductivity and lifetime characteristics of the negative electrode active material may be improved by including a negative electrode active material including an amorphous carbonaceous first coating layer formed on an Si—Fe based alloy core having the composition, D50 values and powder electronic conductivity, and a second coating layer which is formed on the amorphous carbonaceous first coating layer and includes carbon nanotubes (CNTs), thereby having the conductivity path secured more easily.

For example, a negative electrode of the secondary battery such as a lithium secondary battery may be manufactured as follows.

The negative electrode may be prepared from a negative electrode active material composition by mixing a negative electrode active material, a binder, and a solvent. Alternatively, the negative electrode may be prepared from the negative electrode active material composition by adding a conducting agent. The negative electrode may be manufactured by directly coating and drying the negative electrode active material composition on a copper current collector, thereby forming a negative electrode active material layer. Alternatively, the negative electrode may be manufactured by casting the negative electrode active material composition on a separate support, delaminating the cast negative electrode active material composition from the support to obtain a film, and laminating the film on the copper current collector to form a negative electrode active material layer.

The negative electrode active material is the same as mentioned above. Examples of the negative electrode active material may include lithium metals, metal materials that are capable of alloying with lithium, transition metal oxides, materials that are capable of doping or dedoping lithium and materials that are capable of reversibly performing intercalation or deintercalation of lithium ions in addition to the above mentioned negative electrode active material.

Specific examples of the transition metal oxides may include vanadium oxides, lithium vanadium oxides, etc. Examples of the materials that are capable of doping or dedoping lithium may include Si, $SiO_x$ (0<x<2), Sn, $SnO_2$, Sn—Y (Y is an alkali metal, an alkali earth metal, an element of Group 13 to Group 16, a transition metal, a rare earth element, or combined elements thereof except for Sn), and mixtures of $SiO_2$ and at least one thereof. Examples of the element Y may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

The materials that are capable of reversibly performing intercalation or deintercalation of lithium ions may include, as carbonaceous materials, appropriate carbonaceous materials used in lithium secondary batteries. Examples of the carbonaceous materials may include crystalline carbons, amorphous carbons, and mixtures thereof. Examples of the crystalline carbons may include graphites such as amorphous, plate-shaped, flake shaped, spherical or fibrous natural graphites, and artificial graphites. Examples of the amorphous carbons may include soft carbons (carbons calcined at low temperatures), hard carbons, mesophase pitch carbides, calcined cokes, etc.

Examples of the conducting agent may include: metal powders, metal fibers or metal tubes such as carbon black, graphite particles, natural graphites, artificial graphites, acetylene black, Ketjen black, carbon fibers, carbon nanotubes, copper, nickel, aluminum, silver, etc.; and conductive polymers such as polyphenylene derivatives. However, the conducting agent is not limited to the examples, but the examples of the conducting agent additionally include appropriate conducting agents that may be used in the lithium secondary batteries.

Examples of the binder may include vinylidene fluoride-hexafluoropropylene copolymers, polyvinylidene fluoride, polyacrylonitrile, polymethyl methacrylate, polytetrafluoroethylene (PTFE), mixtures of the above-mentioned polymers, and styrene butadiene rubber-based polymers. Examples of the solvent may include N-methylpyrrolidone (NMP), acetone, water, etc. However, the solvent is not limited to the examples, but the examples of the solvent may include appropriate binders that are usable in the lithium secondary batteries.

The negative electrode active material, conducting agent, binder and solvent are contained in amount levels that are usually used in the lithium secondary batteries.

The positive electrode may be manufactured by the same method as that used in manufacturing the negative electrode except that a positive electrode active material instead of the negative electrode active material is used.

For example, the positive electrode may be manufactured as follows.

As in manufacturing the above described negative electrode, a positive electrode active material composition may be prepared by mixing a positive electrode active material, a binder and a solvent, or alternatively, adding a conducting agent. A positive electrode may be manufactured by directly coating the prepared positive electrode active material composition on an aluminum current collector. Alternatively, the positive electrode may be manufactured by casting the positive electrode active material composition on a separate support, delaminating a positive electrode active material film from the support, and laminating the positive electrode active material film on the aluminum current collector.

The positive electrode active material may include compounds represented by Formula 2:

$$Li_xNi_{1-y}M'_yO_{2-z}X_z \quad \text{[FORMULA 2]}$$

wherein M' may be one or more selected from Co, Al, Mn, Mg, Cr, Fe, Ti, Zr, and Mo; X may be one selected from O, F, S, and P; and 0.9≤x≤1.1, 0<y≤0.5, and 0≤z≤2.

The positive electrode active material represented by the formula 2 may be a lithium-nickel composite oxides. The lithium-nickel composite oxides may be a part of nickel of the lithium-nickel composite oxides may be doped with one or more selected from Co, Al, Mn, Mg, Cr, Fe, Ti, Zr and Mo for improving high temperature durability. For example, the lithium-nickel composite oxides may be nickel-cobalt-aluminum (NCA) based composite oxides of which M' includes Co and Al, or nickel-cobalt-manganese (NCM) based composite oxides of which M' includes Co and Mn in terms of energy density, structural stability, and electronic conductivity.

The lithium-nickel composite oxides may include compounds represented by Formula 3:

$$Li_xNi_{1-y'-y''}Co_{y'}Al_{y''}O_2 \quad \text{[FORMULA 3]}$$

wherein 0.9≤x≤1.1, 0<y'+y''≤0.2, and 0≤y'≤0.1. For example, the lithium-nickel composite oxides may include, as such NCA based lithium-nickel composite oxides, Ni-based compounds such as $LiNi_{0.8}Co_{0.15}Al_{0.05}O_2$.

Meanwhile, for example, the lithium-nickel composite oxides may include, as such NCM based lithium-nickel composite oxides, Ni-based compounds such as $LiNi_{0.6}Co_{0.2}Mn_{0.2}O_2$.

Furthermore, compounds that are capable of reversibly performing intercalation or deintercalation of lithium ions that are generally used in the art in addition to the positive electrode active material may be used. Specific examples of the compounds may include compounds represented by any one formula selected from: $Li_aAl_{1-b}B'_bD'_2$ (wherein, 0.90≤a≤1.8 and 0≤b≤0.5); $Li_aE_{1-b}B'_bO_{2-c}D'_c$ (wherein, 0.90≤a≤1.8, 0≤b≤0.5, and 0≤c≤0.05); $LiE_{2-b}B'_bO_{4-c}D'_c$ (wherein, 0≤b≤0.5 and 0≤c≤0.05); $Li_aNi_{1-b-c}Co_bB'_cD'_\alpha$ (wherein, 0.90≤a≤1.8, 0≤b≤0.5, 0≤c≤0.05, and 0<α≤2); $Li_aNi_{1-b-c}Co_bB'_cO_{2-\alpha}F'_\alpha$ (wherein, 0.90≤a≤1.8, 0≤b≤0.5, 0≤c≤0.05, and 0<α<2); $Li_aNi_{1-b-c}Co_bB'_cO_{2-\alpha}F'_2$ (wherein, $0.90 \leq a \leq 1.8$, $0 \leq b \leq 0.5$, $0 \leq c \leq 0.05$, and $0<\alpha<2$); $Li_aNi_{1-b-c}Mn_bB'_cD'_\alpha$ (wherein, $0.90 \leq a \leq 1.8$, $0 \leq b \leq 0.5$, $0 \leq c \leq 0.05$, and $0<\alpha \leq 2$); $Li_aNi_{1-b-c}Mn_bB'_cO_{2-\alpha}F'_\alpha$ (wherein, $0.90 \leq a \leq 1.8$, $0 \leq b \leq 0.5$, $0 \leq c \leq 0.05$, and $0<\alpha<2$); $Li_aNi_{1-b-c}Mn_bB'_cO_{2-\alpha}F''_2$ (wherein, $0.90 \leq a \leq 1.8$, $0 \leq b \leq 0.5$, $0 \leq c \leq 0.05$, and $0<\alpha<2$); $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein, $0 \leq f \leq 2$); $Li_{(3-f)}Fe_2(PO_4)_3$ (wherein, $0 \leq f \leq 2$); and $LiFePO_4$.

In the above chemical formulas, A may be at least one selected from the group consisting of Ni, Co, and Mn; B' may be at least one selected from the group consisting of Al, Ni, Co, Mn, Cr, Fe, Mg, Sr, V, and alkaline rare earth elements; D' may be at least one selected from the group consisting of oxygen (O), fluorine (F), sulfur (S), and phosphorus (P); E may be at least one selected from the group consisting of Co and Mn; F' may be least one selected from the group consisting of F (fluorine), S (sulfur), and P (phosphorous); G may be at least one selected from the group consisting of Al, Cr, Mn, Fe, Mg, lanthanum (La), cerium (Ce), Sr, and V; Q may be least one selected from the group consisting of Ti, Mo, and Mn; I' may be least one selected from the group consisting of Cr, V, Fe, Sc, and Y; and J may be least one selected from the group consisting of V, Cr, Mn, Co, Ni, and Cu The same conducting agent, binder and solvent as those in the negative electrode active material composition may be used in the positive electrode active material composition. Alternatively, a plasticizer may be additionally added to the negative electrode active material composition and the positive electrode active material composition to enable the formation of pores in electrode plates.

The positive electrode active material, conducting agent, binder and solvent are contained in amount levels that are usually used in the lithium secondary batteries. One or more of the conducting agent, binder and solvent may be omitted, depending on uses and compositions of the lithium secondary batteries.

Next, a separator that is inserted between the negative electrode and the positive electrode is prepared. Separators that are appropriately used in the lithium secondary batteries may be usable as the separator. Separators having excellent electrolytic solution-containing capabilities while maintaining low resistance values with respect to movements of electrolyte ions may be used as the separator. Examples of the separator may be selected from glass fibers, polyester, Teflon, polyethylene, polypropylene, polytetrafluoroethylene (PTFE), and combinations thereof. The examples of the separator in a non-woven fabric form or a woven fabric form. Examples of the separator may include separators that can be wound such as polyethylene, polypropylene, and so on may be used in lithium ion batteries. Separators having excellent organic electrolytic solution-impregnating capabilities may be used in lithium ion polymer batteries. For example, the separators may be prepared according to the following method.

A polymer resin, a filler and a solvent are mixed to prepare a separator composition. The separator composition is directly coated and dried on the top of electrodes to form a separator. Alternatively, the separator composition is cast and dried on a support, a separator film is delaminated from the support, and the separator film is laminated on the top of the electrodes such that a separator can be formed.

A polymer resin used in the preparation of the separator is not particularly limited, and all materials used in the binder of the electrode plates may be used as the polymer resin. Examples of the polymer resin may include vinylidene fluoride-hexafluoropropylene copolymers, polyvinylidene fluoride (PVDF), polyacrylonitrile, polymethyl methacrylate, and mixtures thereof.

Next, an electrolyte is prepared.

For example, the electrolyte may be an organic electrolytic solution. Further, the electrolyte may be a solid. Examples of the electrolyte may include boron oxides, lithium oxynitrides, etc. However, the electrolyte is not limited to the examples, and appropriate solid electrolytes that are usable in the lithium secondary batteries may be used as the electrolyte. The solid electrolyte may be formed on the negative electrode by such methods as sputtering, etc.

For example, an organic electrolytic solution may be prepared. The organic electrolytic solution may be prepared by dissolving a lithium salt into an organic solvent.

All materials that can be used as the organic solvent in the art may be used as the organic solvent. Examples of the organic solvent may include propylene carbonate, ethylene carbonate, fluoroethylene carbonate, butylenes carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, α-butyrolactone, dioxolane, 4-methyl dioxolane, N,N-dimethyl formamide, dimethyl acetamide, dimethyl sulfoxide, dioxane, 1,2-dimethoxyethane, sulfolane, dichloroethane, chlorobenzene, diethylene glycol, dimethyl ether, and mixtures thereof.

Appropriate lithium salts that are usable as the lithium salt in the art may be used as the lithium salt. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and mixtures thereof.

Figure 7:
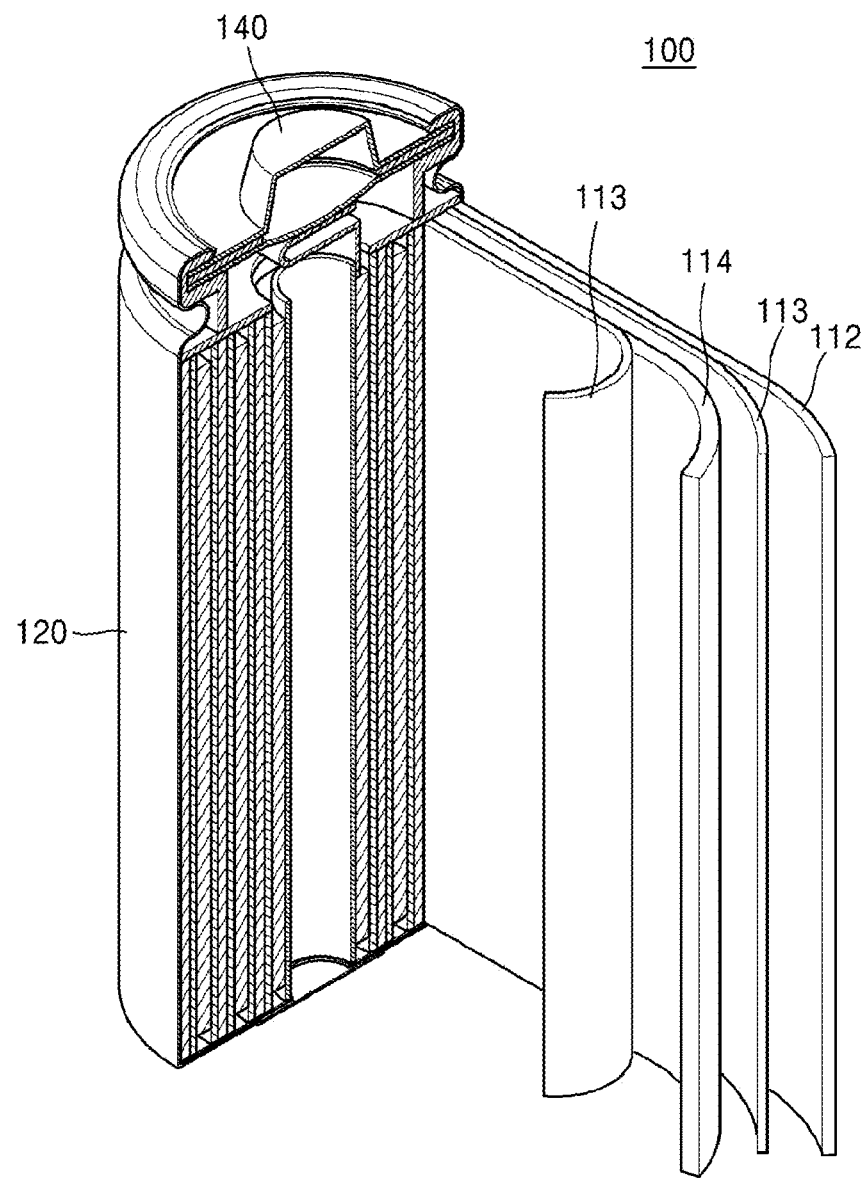
FIG. 7 is an exploded perspective view of a lithium secondary battery according to one or more exemplary embodiments.

FIG. 7 is an exploded perspective view of a lithium secondary battery according to one or more exemplary embodiments.

A lithium secondary battery 100 includes a positive electrode 114, a separator 113, and a negative electrode 112. The positive electrode 114, the separator 113, and the negative electrode 112 are accommodated in being wound or folded before they are accommodated into a battery container 120. Subsequently, an organic electrolytic solution is injected into the battery container 120, and the battery container 120 containing the organic electrolytic solution is sealed by a sealing member 140 to complete the lithium secondary battery 100. Examples of the battery container may include a cylindrical type, a rectangular type, a thin film type, etc. The lithium secondary battery may be a lithium ion battery, or may be formed in a battery structure. After the battery structure is laminated into a bi-cell structure, the bi-cell structure is impregnated with an organic electrolytic solution to obtain a resulting material, and the resulting material is accommodated and sealed into a pouch to complete a lithium ion polymer battery.

A capacity retention rate of the secondary battery of the $100^{th}$ cycle capacity with respect to the $1^{st}$ cycle capacity after charging and discharging the secondary battery 100 times cycles at a 1C charge rate and at a 3C discharge rate is about 73% or higher. A capacity retention rate of the secondary battery of the $100^{th}$ cycle capacity with respect to the $1^{st}$ cycle capacity after charging and discharging the secondary battery 100 times cycles at a 1C charge rate and a 7C discharge rate is about 65% or higher. At this time, the secondary battery may have cutoff voltage values of 4.2 V and 2.4 V respectively. Therefore, the secondary battery is excellent in high-rate lifetime characteristics at a 1C charge rate and a 3C discharge rate, and at a 1C charge rate and a 7C discharge rate.

Hereinafter, exemplary embodiments of the present disclosure are described more in detail through the following Examples and Comparative Examples. However, such embodiments are provided for illustrative purposes only, and the scope of the present disclosure should not be limited thereto in any manner. Further, it should be understood that the present disclosure is not limited to the above descriptions since other various modifications of the present disclosure may occur to persons having ordinary knowledge in the related art of the present disclosure.

EXAMPLES

Manufacturing of Lithium Secondary Batteries

Example 1—(Preparation of a Negative Electrode Active Material)

An Si powder (available from Kojundo Chemical Laboratory Co., Ltd., ≥99%) having an average particle diameter of 5 μm, an Fe powder (available from Kojundo Chemical Laboratory Co., Ltd., ≥99%) having an average particle diameter of 3 μm to 5 μm, and a C powder (available from by Kojundo Chemical Laboratory Co., Ltd., ≥99%) having an average particle diameter of 5 μm were prepared as starting materials. The Si powder, Fe powder and C powder were put into a planetary ball mill (available from Zoz GmbH, CM01) at an atomic percentage (at %) ratio of 75:14:11, and the Si powder, Fe powder and C powder were mixed and milled at a rotation speed of 500 rpm for 24 hours in a nitrogen atmosphere to obtain an Si—Fe—C alloy core.

An amorphous carbon-containing first coating layer was formed on the obtained Si—Fe—C alloy core using a Chemical Vapor Deposition (CVD) method ($Ar/C_2H_2$ volume gas ratio: 100% methane gas, deposition time: 1800 s, flow velocity: 1 lpm, and deposition temperature: 1000° C.) through the pyrolysis of acetylene ($C_2H_2$) as a carbon precursor gas.

Single-walled carbon nanotubes (available from UBE Corporation, BET: 265 $m^2/g$, density: 0.01 g/cc, average length: 3 μm to 4 μm), carboxymethyl cellulose (CMC), and water were mixed at a ratio of 3.0% by weight:3.6% by weight:93.4% by weight to prepare a dispersion. After putting an ultrasonicator (available from Daihan Scientific, DH.D400H, oscillation frequency: 40 kHz) into the dispersion, the ultrasonicator was operated for 30 minutes to prepare a dispersion in which the single-walled carbon nanotubes were milled to an average length of 100 nm to 700 nm.

After putting the Si—Fe—C alloy core on which the amorphous carbon-containing first coating layer was formed into the prepared dispersion of a volume including 1 part by weight of the single-walled carbon nanotubes with respect to the total negative electrode active material weight of 100 parts by weight, the Si—Fe—C alloy core on which the amorphous carbon-containing first coating layer was formed was stirred by a planetary centrifugal mixer (Thinky mixer, ARE 310) for 30 minutes, and the stirred Si—Fe—C alloy core on which the amorphous carbon-containing first coating layer was formed was dried at 110° C. to prepare a negative electrode active material in which a second coating layer of single-walled carbon nanotubes (CNTs) was formed on the amorphous carbon-containing first coating layer. At this time, the amorphous carbon-containing first coating layer was contained in an amount of 3 parts by weight with respect to the total negative electrode active material weight of 100 parts by weight.

(Manufacturing of Negative Electrode)

The prepared negative electrode active material, graphite, styrene butadiene rubber (SBR), and carboxymethyl cellulose (CMC) were mixed to a weight ratio of 22:75:1.5:1.5 using a PD mixer (available from KM Tech) to prepare a negative electrode active material slurry.

The negative electrode active material slurry was coated and dried to a thickness of 50 μm to 60 μm on a copper foil having a thickness of 10 μm by a three-roll coater, and the dried negative electrode active material slurry was additionally dried once again at a vacuum condition of 120° C. to manufacture a negative electrode plate. The negative electrode plate was rolled by a roll press to manufacture a negative electrode having a size of 230 mm (width)×58 mm (length).

(Manufacturing of a Positive Electrode)

After uniformly mixing a $LiNi_{0.8}CO_{0.15}Al_{0.05}O_2$ positive electrode active material powder and a carbon conducting agent (Denka Black), a pyrrolidone solution including a polyvinylidene fluoride (PVDF) binder was added to the mixture to prepare a positive electrode active material slurry such that the positive electrode active material slurry had a weight ratio of positive electrode active material:carbon conducting agent:binder=97:1.4:1.6.

The positive electrode active material slurry was coated and dried to a thickness of 70 μm on an aluminum foil having a thickness of 15 μm by a three-roll coater, and the dried positive electrode active material slurry was additionally dried once again at a vacuum condition of 110° C. to manufacture a positive electrode plate. The positive electrode plate was rolled by a roll press to manufacture a positive electrode having a size of 190 mm (width)×54 mm (length).

(Manufacturing of Lithium Secondary Batteries)

A 18650 mini full cell was manufactured using the negative electrode, the positive electrode, ethylene carbonate (EC), diethyl carbonate (DEC), ethyl methyl carbonate (EMC), a 1.3M $LiPF_6$ lithium salt-dissolved electrolyte, and a polyethylene separator wherein EC, DEC and EMC had a volume ratio of 3:5:2.

Example 2

A 18650 mini full cell was manufactured by the same method as in Example 1 except that, when preparing the negative electrode active material of Example 1, a ultrasonicator (available from DAIHAN Scientific Co., Ltd., DH.D400H, oscillation frequency: 40 kHz) was put into the dispersion, and the ultrasonicator was operated for 10 minutes to prepare a dispersion in which the carbon nanotubes were milled to an average length of 800 nm to 2.0 μm.

Example 3

A 18650 mini full cell was manufactured by the same method as in Example 1 except that, when preparing the negative electrode active material of Example 1, the negative electrode active material according to Example 1 was put into the prepared dispersion of a volume including 5 parts by weight of the carbon nanotubes with respect to the total negative electrode active material weight of 100 parts by weight, the negative electrode active material and the dispersion were stirred by a planetary centrifugal mixer (Thinky mixer, ARE 310) for 30 minutes, and the stirred mixture was dried at 110° C. to prepare a negative electrode active material in which a second coating layer of carbon nanotubes (CNTs) was formed on the amorphous carbon-containing first coating layer formed on the Si—Fe—C alloy core.

Comparative Example 1

A 18650 mini full cell was manufactured by the same method as in Example 1 except that, when preparing the negative electrode active material of Example 1, the negative electrode active material was prepared without milling using a ultrasonicator a dispersion prepared by mixing single-walled carbon nanotubes (available from UBE Corporation, BET: 265 m²/g, density: 0.01 g/cc, average length: 3 μm to 4 μm), carboxymethyl cellulose (CMC), and water at a ratio of 3.0% by weight:3.6% by weight:93.4% by weight. At this time, the single-walled carbon nanotubes included in the second coating layer in the negative electrode active material had an average length of 3.0 μm or longer.

Comparative Example 2

A 18650 mini full cell was manufactured by the same method as in Example 1 except that, when preparing the negative electrode active material, an Si—Ti—Ni alloy core as a core material was prepared and used as described below, and a positive electrode active material was used in which a positive electrode active material, a carbon conducting agent and a binder were mixed such that the positive electrode active material, the carbon conducting agent and the binder had a weight ratio of 86:8:6 when manufacturing a positive electrode.

In order to prepare the Si—Ti—Ni alloy core, an Si powder (available from Kojundo Chemical Laboratory Co., Ltd., ≥99%) having an average particle diameter of 5 μm, a Ti powder (available from Kojundo Chemical Laboratory Co., Ltd., ≥99%) having an average particle diameter of 38 and an Ni powder (available from Kojundo Chemical Laboratory Co., Ltd., ≥99%) having an average particle diameter of 3 μm to 5 μm were prepared as starting materials. The Si powder, Ti powder and Ni powder were put into a planetary ball mill (manufactured by Zoz GmbH, CM01) at an atomic percentage (at %) ratio of 66:17:17, and the Si powder, Ti powder and Ni powder were mixed and milled at a rotation speed of 500 rpm for 24 hours in a nitrogen atmosphere to obtain an Si—Ti—Ni alloy core.

Comparative Example 3

A 18650 mini full cell was manufactured by the same method as in Comparative Example 2 except that, when preparing the negative electrode active material of Comparative Example 2, a ultrasonicator (available from DAIHAN Scientific Co., Ltd., DH.D400H, oscillation frequency: 40 kHz) was put into the dispersion, and the ultrasonicator was operated for 10 minutes to prepare a dispersion in which the carbon nanotubes were milled to an average length of 800 nm to 2.0 μm.

Comparative Example 4

A 18650 mini full cell was manufactured by the same method as in Example 1 except that, when preparing the negative electrode active material of Example 1, single-walled carbon nanotubes (available from UBE Corporation, BET: 265 m²/g, density: 0.01 g/cc, average length: 3 μm to 4 μm), carboxymethyl cellulose (CMC), and water were mixed at a ratio of 3.0% by weight:3.6% by weight:93.4% by weight to prepare a dispersion, a negative electrode active material was prepared from the dispersion without the dispersion being milled by a ultrasonicator, the negative electrode active material according to Example 1 was put into the prepared dispersion of a volume including 7 parts by weight of the carbon nanotubes with respect to the total negative electrode active material weight of 100 parts by weight, the negative electrode active material and the dispersion were stirred by a planetary centrifugal mixer (Thinky mixer, ARE 310) for 30 minutes, and the stirred mixture was dried at 110° C. to prepare a negative electrode active material in which a second coating layer of carbon nanotubes (CNTs) was formed on the amorphous carbon-containing first coating layer formed on the Si—Fe—C alloy core.

Comparative Example 5

A 18650 mini full cell was manufactured by the same method as in Example 1 except that, when preparing the negative electrode active material of Example 1, the amorphous carbon-containing first coating layer formed Si—Fe—C alloy core was used as the negative electrode active material, and the negative electrode active material, graphite, styrene butadiene rubber (SBR), and carboxymethyl cellulose (CMC) were added and mixed to a ratio of 22% by weight:75% by weight:1.5% by weight:1.5% by weight in an agate mortar to prepare a negative electrode active material slurry.

Comparative Example 6

A 18650 mini full cell was manufactured by the same method as in Comparative Example 2 except that, when preparing the negative electrode active material of Comparative Example 2, the amorphous carbon-containing first coating layer formed Si—Ti—Ni alloy core was used as the negative electrode active material, and the negative electrode active material, graphite, styrene butadiene rubber (SBR), and carboxymethyl cellulose (CMC) were added and mixed to a ratio of 22% by weight:75% by weight:1.5% by weight:1.5% by weight in an agate mortar to prepare a negative electrode active material slurry.

Constructions for the negative electrode active materials included in the lithium secondary batteries according to Examples 1 to 3, and Comparative Examples 1 to 6 are arranged in the following Table 1.

TABLE 1

| Classification | Core alloy composition | Whether there is a first coating layer or not | Second coating layer | | | 
| --- | --- | --- | --- | --- | --- |
| | | | Whether the second coating layer contains CNTs or not | Average length of CNTs | Content of CNTs (weight part(s) based on 100 parts by weight of the negative electrode active material) |
| Example 1 | Si—Fe—C alloy | ○ | ○ | 100 nm to 700 nm | 1 weight part |
| Example 2 | Si—Fe—C alloy | ○ | ○ | 800 nm to 2.0 μm | 1 weight part |
| Example 3 | Si—Fe—C alloy | ○ | ○ | 100 nm to 700 nm | 5 parts by weight |

TABLE 1-continued

|  |  | Second coating layer | | | |
|---|---|---|---|---|---|
| Classification | Core alloy composition | Whether there is a first coating layer or not | Whether the second coating layer contains CNTs or not | Average length of CNTs | Content of CNTs (weight part(s) based on 100 parts by weight of the negative electrode active material) |
| Comparative Example 1 | Si—Fe—C alloy | ○ | ○ | 3.0 μm or longer | 1 weight part |
| Comparative Example 2 | Si—Ti—Ni alloy | ○ | ○ | 3.0 μm or longer | 1 weight part |
| Comparative Example 3 | Si—Ti—Ni alloy | ○ | ○ | 100 nm to 700 nm | 1 weight part |
| Comparative Example 4 | Si—Fe—C alloy | ○ | ○ | 3.0 μm or longer | 7 parts by weight |
| Comparative Example 5 | Si—Fe—C alloy | ○ | x | x | x |
| Comparative Example 6 | Si—Ti—Ni alloy | ○ | x | x | x |

"○" means that first coating layer is present and "x" means second coating layer containing CNTs is not present.

Analysis Example 1: Scanning Electron Microscope (SEM) Photographs

Shapes of the negative electrode active materials included in the lithium secondary batteries according to Examples 1 to 3 and Comparative Examples 1 to 4 were observed in a in a magnification of 10,000 using a Scanning Electron Microscope (SEM). An SEM (available from Hitachi Corporation, S-5500) was used as the SEM. The observation results were shown in FIGS. 2A to 2H.

Figure 2A:
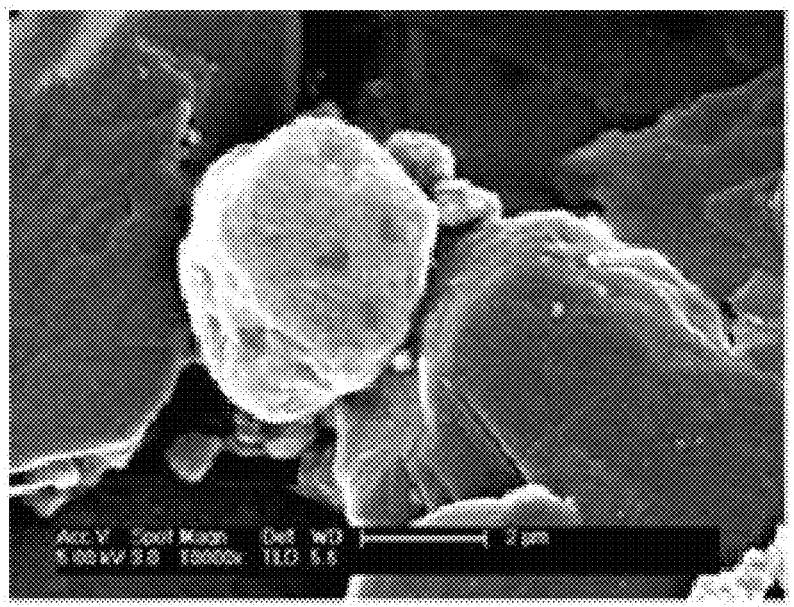
FIG. 2A is a Scanning Electron Microscope (SEM) photograph showing in a magnification of 10,000, shape of a Si—Fe—C alloy core on which an amorphous carbon-containing first coating layer produced during the preparation of a negative electrode active material included in a lithium secondary battery according to Example 1 is formed.
Figure 2B:
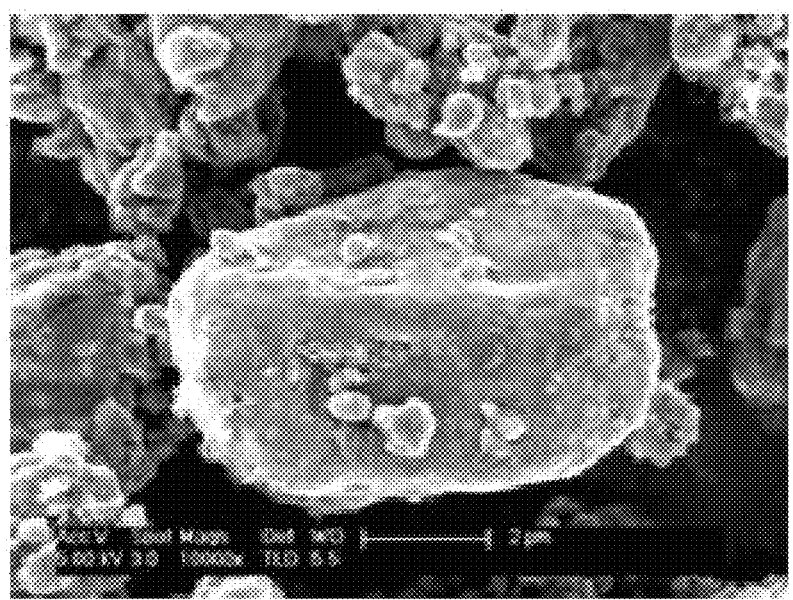
FIG. 2B to FIG. 2H show in a magnification of 10,000, Scanning Electron Microscope (SEM) photographs of shapes of negative electrode active materials included in lithium secondary batteries according to Examples 1 to 3 and Comparative Examples 1 to 4.
Figure 2C:
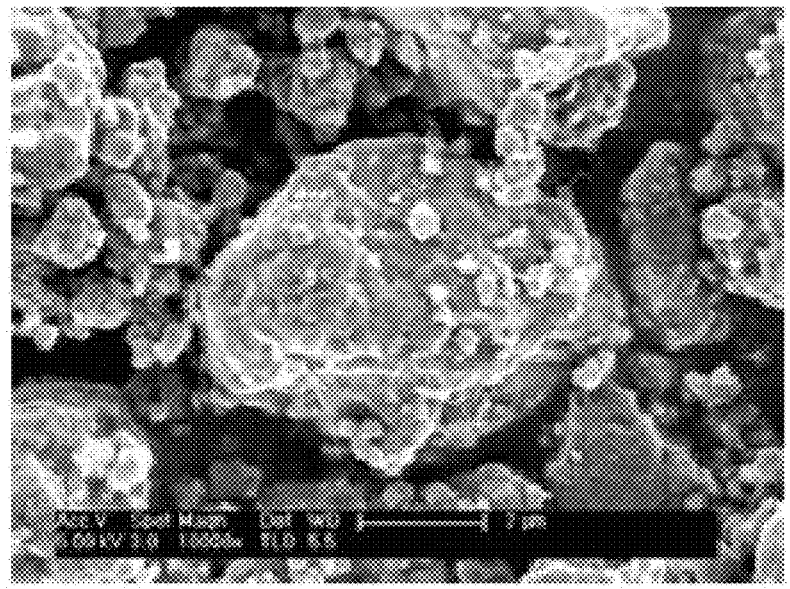
Figure 2D:
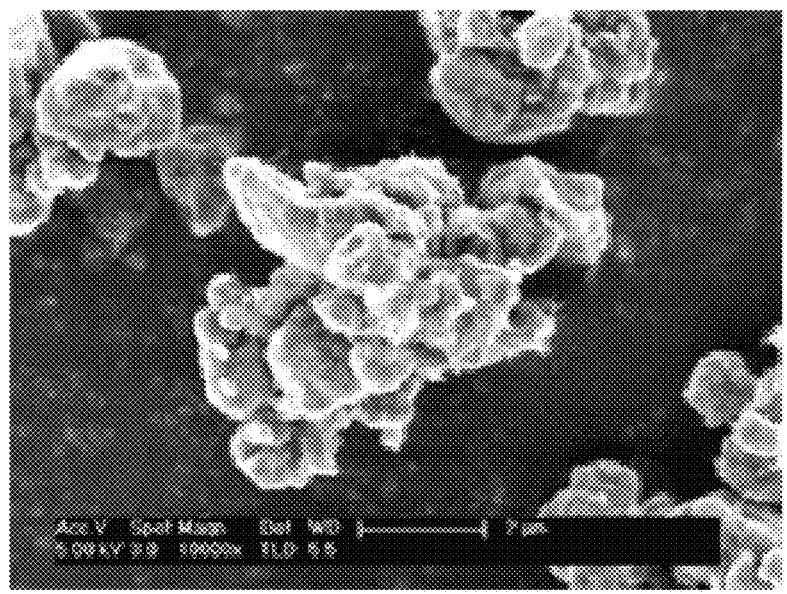
Figure 2E:
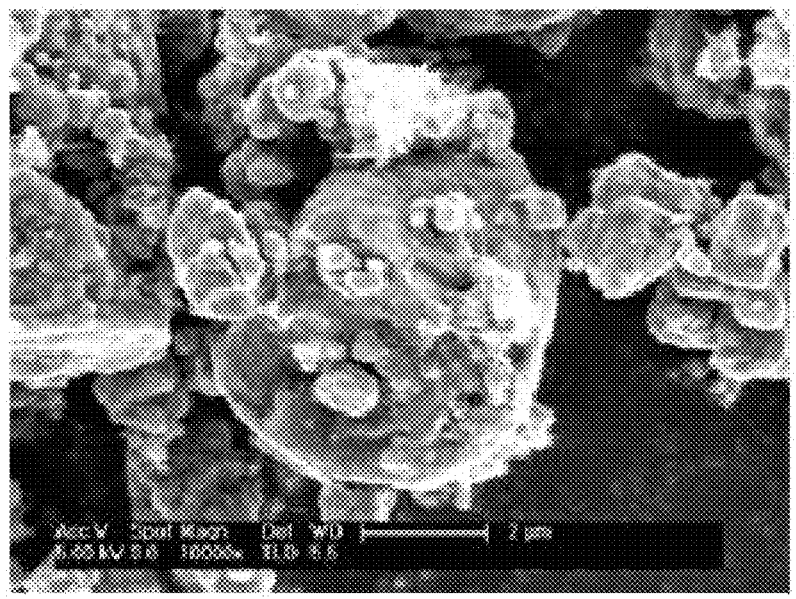
Figure 2F:
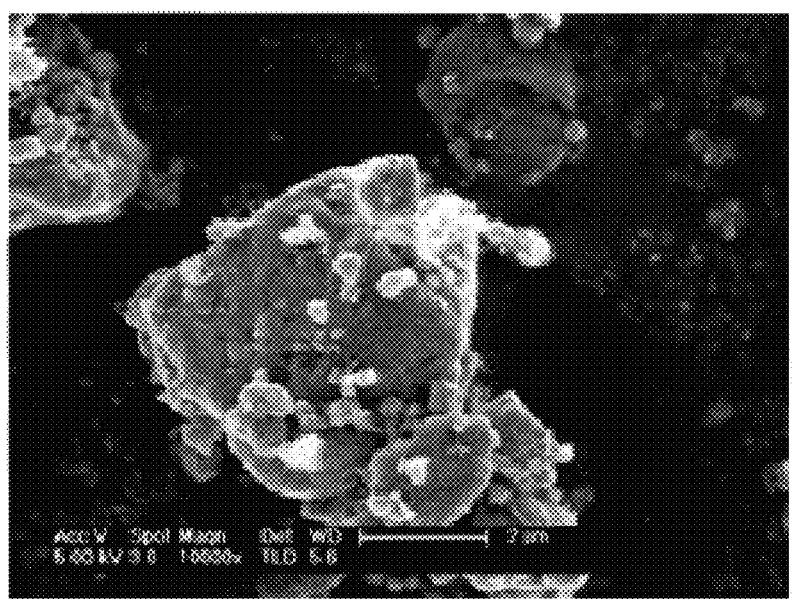
Figure 2G:
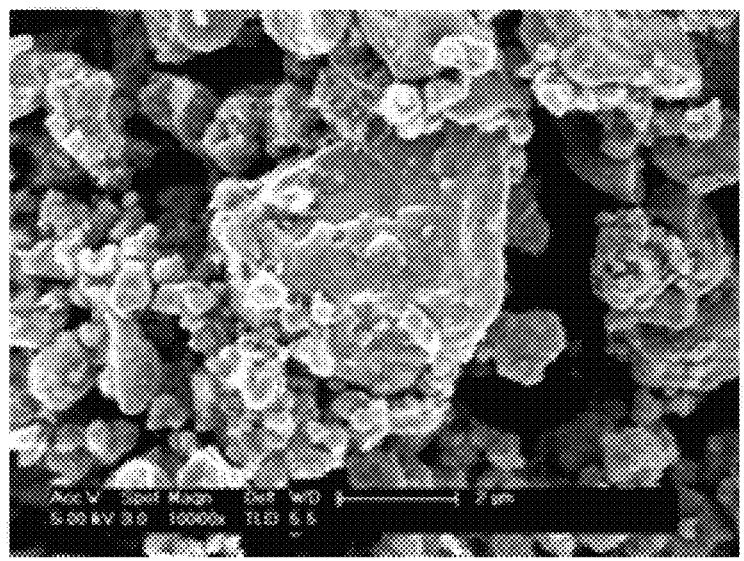
Figure 2H:
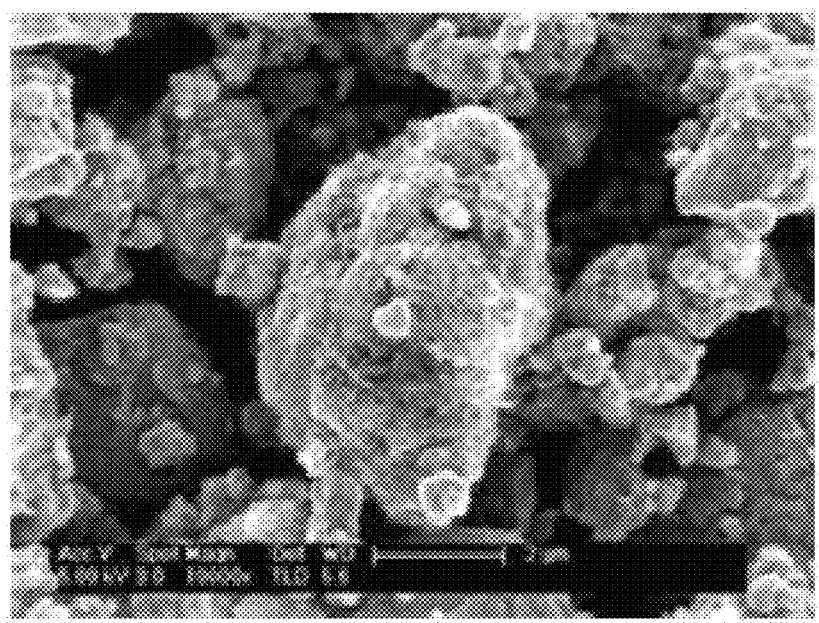

Referring to FIG. 2A, it can be confirmed that the amorphous carbon-containing first coating layer is formed on the core in the negative electrode active material included in the lithium secondary battery according to Example 1. Referring to FIG. 2b, it can be confirmed that the amorphous carbon-containing first coating layer is formed on the core, and the second coating layer of the carbon nanotubes is formed on the amorphous carbon-containing first coating layer.

Referring to FIGS. 2C to 2H, it can be confirmed that the amorphous carbon-containing first coating layer is formed on the core, and the second coating layer of the carbon nanotubes is formed on the amorphous carbon-containing first coating layer in the negative electrode active materials included in the lithium secondary batteries according to Examples 2 and 3, and Comparative Examples 1 and 4.

Analysis Example 2: X-Ray Diffraction Analysis (XRD)

X-ray diffraction analysis tests were performed on the negative electrode active materials of the amorphous carbon-containing first coating layer formed Si—Fe—C alloy core and the amorphous carbon-containing first coating layer formed Si—Ti—Ni alloy core included in the lithium secondary batteries according to Example 1 and Comparative Example 2. The X-ray diffraction analysis tests were performed using X'pert PRO MPD manufactured by PANalytical Corporation. A CuK-alpha characteristic X-ray wavelength 1.541 Å was used as a test condition. Results of the X-ray diffraction analysis tests are shown in FIGS. 3A and 3B.

Figure 3A:
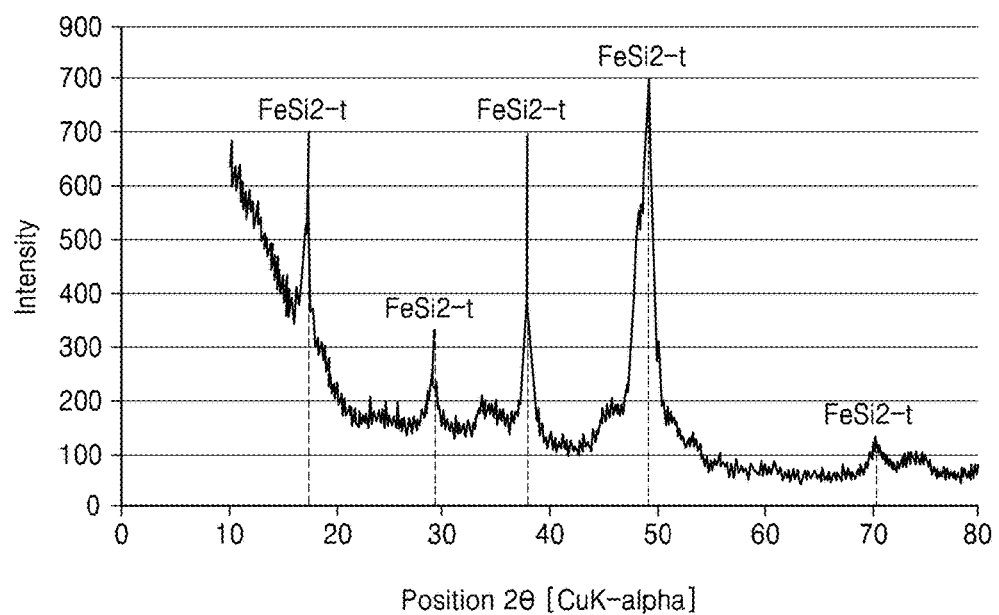
FIG. 3A and FIG. 3B show X-ray diffraction (XRD) analysis results for an Si—Fe—C alloy core on which an amorphous carbon-containing first coating layer included in a lithium secondary battery according to Example 1 is formed, and for an Si—Ti—Ni alloy core on which an amorphous carbon-containing first coating layer included in a lithium secondary battery according to Comparative Example 2 is formed.

Referring to FIG. 3A, it can be confirmed that a matrix of an $FeSi_2$ phase (Fe:Si=1:2) is formed in the amorphous carbon-containing first coating layer formed Si—Fe—C alloy core of the negative electrode active material included in the lithium secondary battery according to Example 1.

Figure 3B:
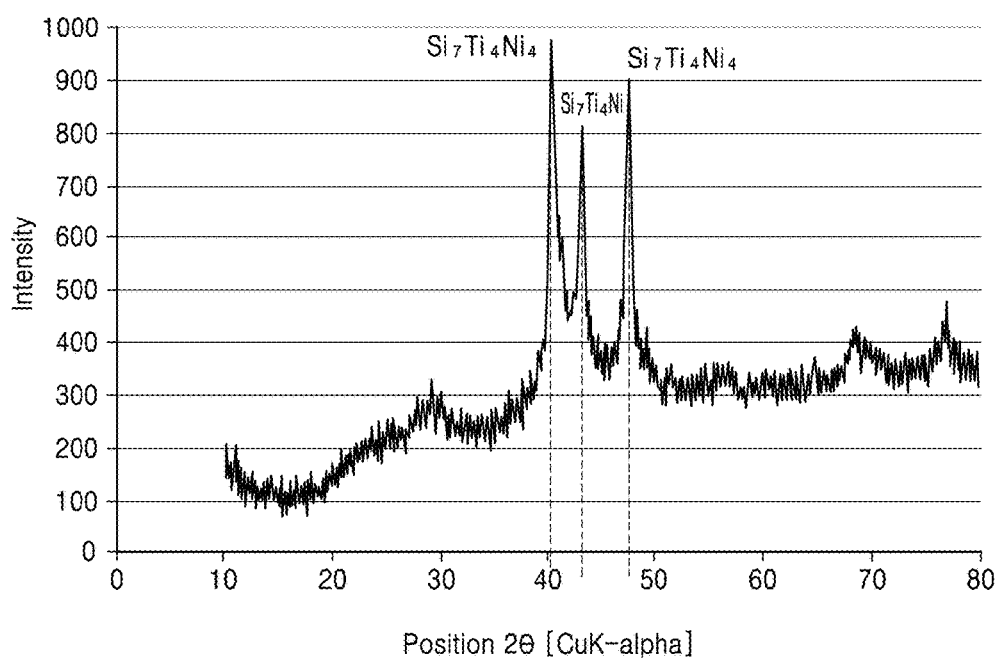

Referring to FIG. 3B, it can be confirmed that a matrix of $Si_7Ti_4Ni_4$ is formed entirely in the amorphous carbon-containing first coating layer formed Si—Ti—Ni alloy core of the negative electrode active material included in the lithium secondary battery according to Comparative Example 2.

Analysis Example 3: Particle Size Distribution Analysis

After putting an Si—Fe—C alloy core powder and an Si—Ti—Ni alloy core powder of the negative electrode active materials included in the lithium secondary batteries according to Example 1 and Comparative Example 2 into a 20 ml vial bottle in an amount of about 0.1 g, and then the vial bottle was filled with distilled water in a residual amount to show a particle size distribution using an LS 13 320 model of Hitachi Corporation. Before showing the particle size distribution, the distilled water and the respective Si—Fe—C alloy core powder and Si—Ti—Ni alloy core powder of the negative electrode active materials included in the lithium secondary batteries according to Example 1 and Comparative Example 2 in the vial bottle were dispersed for about 1 minute using a ultrasonicator. Dispersing results were represented in Table 2 and FIG. 4.

TABLE 2

| Classification | D(50) (μm) |
|---|---|
| Example 1 | 5.777 |
| Comparative Example 2 | 4.449 |

Figure 4:
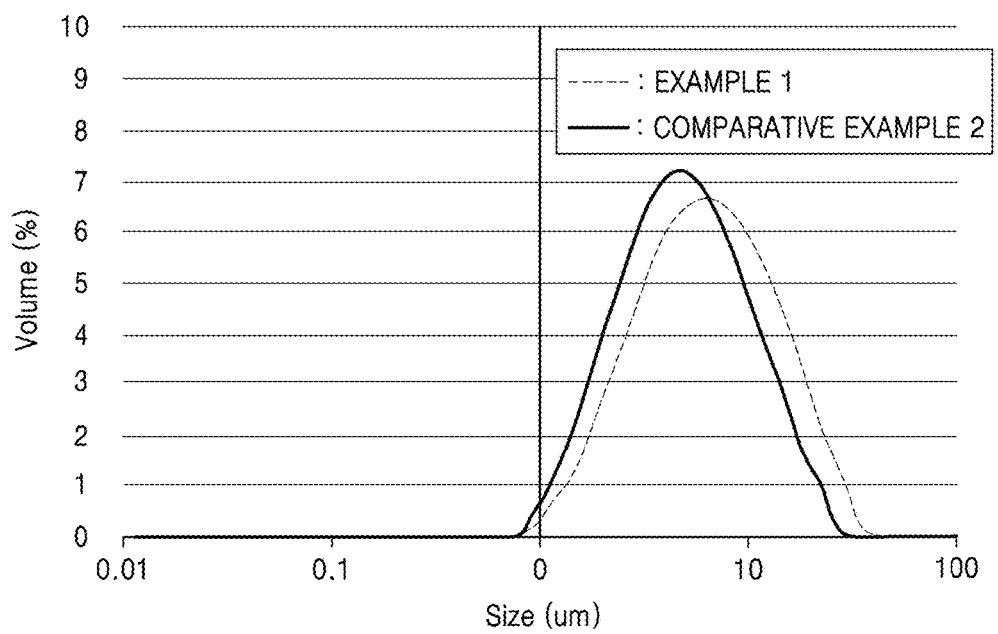
FIG. 4 shows data of particle size analysis results for an Si—Fe—C alloy core on which an amorphous carbon-containing first coating layer included in a lithium secondary battery according to Example 1 is formed, and for an Si—Ti—Ni alloy core on which an amorphous carbon-containing first coating layer included in a lithium secondary battery according to Comparative Example 2 is formed.

Referring to Table 2 and FIG. 4, the Si—Fe—C alloy core powder and Si—Ti—Ni alloy core powder of the negative electrode active materials included in the lithium secondary batteries according to Example 1 and Comparative Example 2 had almost similar D50 values. Hereby, it can be confirmed that there is no difference between particle sizes of the Si—Fe—C alloy core powder and Si—Ti—Ni alloy core powder of the negative electrode active materials included in the lithium secondary batteries according to Example 1 and Comparative Example 2, and it can be seen from this that a powder electronic conductivity difference between the Si—Fe—C alloy core powder and Si—Ti—Ni alloy core powder of the negative electrode active materials included in the lithium secondary batteries according to Example 1 and Comparative Example 2 is not caused by a difference in the D50 values thereof.

Evaluation Example 1: Evaluating Electronic Conductivities of Powders

Powder electronic conductivity tests were performed on powder densities of the Si—Fe—C alloy core powder and Si—Ti—Ni alloy core powder of the negative electrode active materials included in the lithium secondary batteries according to Example 1 and Comparative Example 2. After compressing the powders into pellets, powder electrical conductivities were measured from the pellets using a powder density device (available from Mitsubishi Chemical Analytech Corporation, PD-51). Powder electronic conductivity measuring results were shown in FIG. 5.

Figure 5:
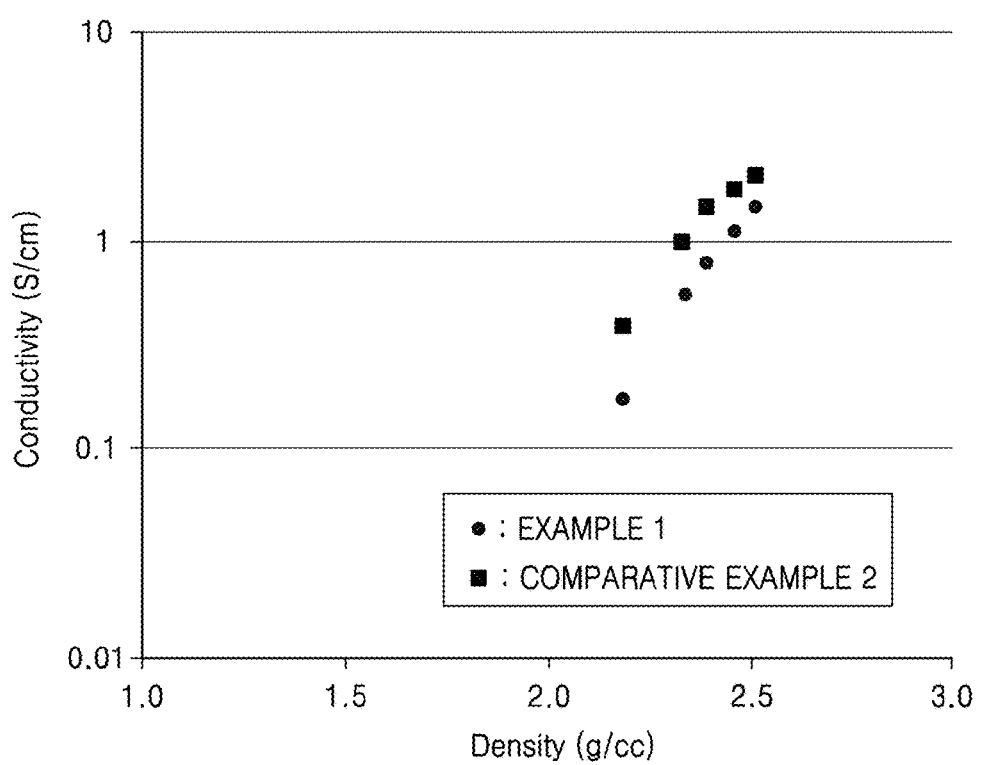
FIG. 5 shows powder conductivities for powder densities of Si—Fe—C alloy core powders and Si—Ti—Ni alloy core powders of negative electrode active materials included in lithium secondary batteries according to Example 1 and Comparative Example 2.

Referring to FIG. 5, it can be confirmed that the Si—Fe—C alloy core powder of the negative electrode active material included in the lithium secondary battery according to Example 1 has a powder electronic conductivity of about 0.2 S/cm to about 2.0 S/cm at a powder density of about 2.1 g/cc to about 2.5 g/cc.

It can be confirmed that the Si—Ti—Ni alloy core powder of the negative electrode active material included in the lithium secondary battery according to Comparative Example 2 has a powder electronic conductivity of about 0.7 S/cm to about 3.0 S/cm at a powder density of about 2.1 g/cc to about 2.5 g/cc. Hereby, it can be confirmed that a powder electronic conductivity of the Si—Fe—C alloy core powder of the negative electrode active material included in the lithium secondary battery according to Example 1 is lower than that of the Si—Ti—Ni alloy core powder of the negative electrode active material included in the lithium secondary battery according to Comparative Example 2.

Evaluation Example 2: Charge/Discharge Characteristics Evaluation—Lifetime Characteristics Evaluation Charge/discharge characteristics of the lithium secondary batteries according to Examples 1 to 3, and Comparative Examples 1 to 6 were evaluated. Evaluation tests of the charge/discharge characteristics were taken in the following conditions to obtain the evaluation test results.

After performing a charging process to 0.2C for the lithium secondary batteries according to Examples 1 to 3 and Comparative Examples 1 to 6 at room temperature until they reached 4.2 V, and a constant current discharge process was performed to 0.2C on the charged lithium secondary batteries until they reached a cut-off voltage of 2.5 V. Charge capacities and discharge capacities (charge capacities and discharge capacities at $1^{st}$ cycle) of the constant current discharged lithium secondary batteries were measured.

Next, after charging the lithium secondary batteries to 1C in the above-described charging forms, a discharging process was performed on the charged lithium secondary batteries to 1C until they reached 2.5 V. Charge capacities and discharge capacities of the lithium secondary batteries were measured at this time. Such charging and discharging processes were repeatedly performed on the lithium secondary batteries to respectively measure discharge capacities of the lithium secondary batteries at $100^{th}$ cycles.

Further, after charging the lithium secondary batteries to 1C in the above-described charging forms, a discharging process was performed on the charged lithium secondary batteries to 3C until they reached 2.5 V. Charge capacities and discharge capacities of the lithium secondary batteries were measured at this time. Such charging and discharging processes were repeatedly performed on the lithium secondary batteries to respectively measure discharge capacities of the lithium secondary batteries at $100^{th}$ cycles.

Further, after charging the lithium secondary batteries to 1C in the above-described charging forms, a discharging process was performed on the charged lithium secondary batteries to 7C until they reached 2.5 V. Charge capacities and discharge capacities of the lithium secondary batteries were measured at this time. Such charging and discharging processes were repeatedly performed on the lithium secondary batteries to respectively measure discharge capacities of the lithium secondary batteries at the $100^{th}$ cycles. Lifetime characteristics were evaluated by calculating capacity retention rates % from the following Equation 1. Evaluation results were respectively represented in order in the following Tables 3 to 5, and FIGS. 6A to 6C.

$$\text{Capacity retention rate \%} = [(\text{discharge capacity at the } 100^{th} \text{ cycle}/\text{discharge capacity at the } 1^{st} \text{ cycle})] \times 100 \quad \text{[Equation 1]}$$

TABLE 3

| Classification | Discharge capacity (1 C/1 C) at the $1^{st}$ cycle mAh | Discharge capacity (1 C/1 C) at the $100^{th}$ cycle mAh | Capacity retention rate % |
| --- | --- | --- | --- |
| Example 1 | 421 | 362.9 | 86.2 |
| Example 2 | 420.6 | 356.7 | 84.8 |
| Example 3 | 428.2 | 363.5 | 84.9 |
| Comparative Example 1 | 434 | 334.6 | 77.1 |
| Comparative Example 2 | 432.1 | 337 | 78.0 |
| Comparative Example 3 | 430.5 | 341.4 | 79.3 |
| Comparative Example 4 | 418.6 | 299.7 | 71.6 |
| Comparative Example 5 | 434 | 329.4 | 75.9 |
| Comparative Example 6 | 433.7 | 331.3 | 76.4 |

TABLE 4

| Classification | Discharge capacity (1 C/3 C) at the $1^{st}$ cycle mAh | Discharge capacity (1 C/3 C) at the $100^{th}$ cycle mAh | Capacity retention rate % |
| --- | --- | --- | --- |
| Example 1 | 399.9 | 339.9 | 85.0 |
| Example 2 | 399.5 | 298 | 74.6 |
| Example 3 | 406.8 | 322.6 | 79.3 |
| Comparative Example 1 | 412.3 | 257.3 | 62.4 |
| Comparative Example 2 | 410.5 | 260.7 | 63.5 |
| Comparative Example 3 | 408.9 | 264.6 | 64.7 |
| Comparative Example 4 | 397.7 | 186.5 | 46.9 |
| Comparative Example 5 | 412 | 247.2 | 60.0 |
| Comparative Example 6 | 412 | 252.1 | 61.2 |

TABLE 5

| Classification | Discharge capacity (1 C/7 C) at the 1st cycle mAh | Discharge capacity (1 C/7 C) at the 100th cycle mAh | Capacity retention rate % |
|---|---|---|---|
| Example 1 | 387.3 | 307.1 | 79.3 |
| Example 2 | 386.9 | 263.5 | 68.1 |
| Example 3 | 393.9 | 303.7 | 77.1 |
| Comparative Example 1 | 399.3 | 234 | 58.6 |
| Comparative Example 2 | 397.5 | 235.3 | 59.2 |
| Comparative Example 3 | 396.1 | 237.7 | 60.0 |
| Comparative Example 4 | 385.1 | 155.6 | 40.4 |
| Comparative Example 5 | 399.3 | 230 | 57.6 |
| Comparative Example 6 | 399 | 231 | 57.9 |

Figure 6A:
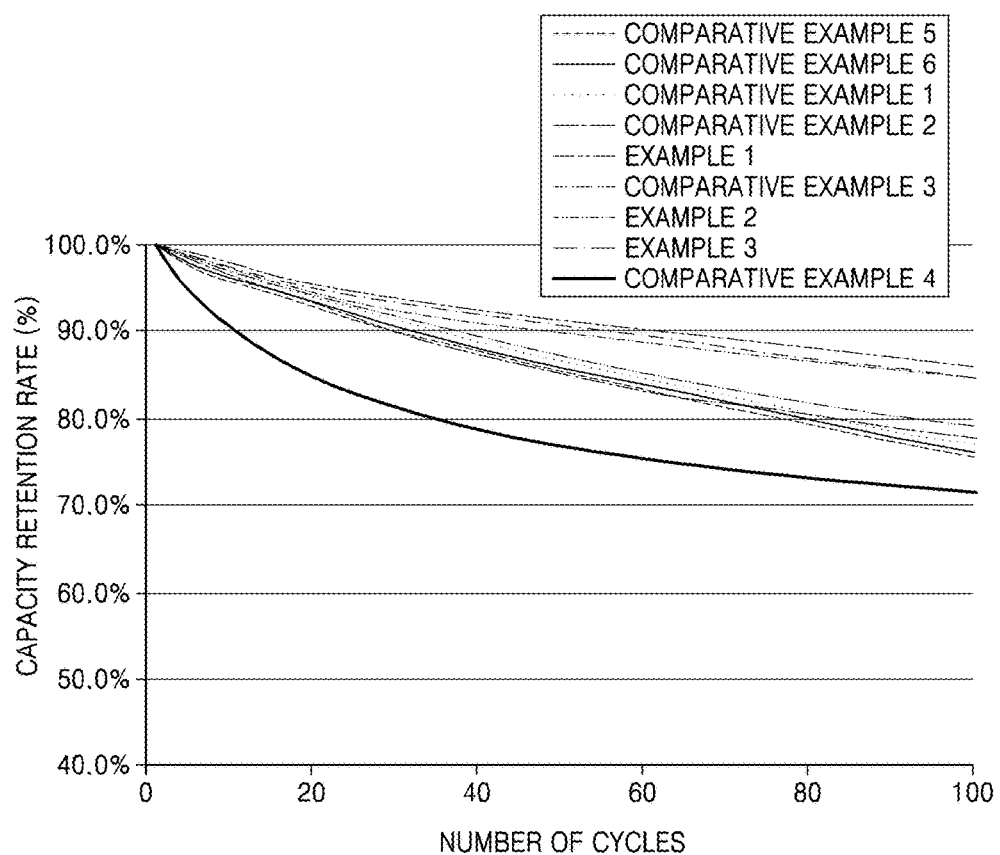
FIG. 6A is a graph showing capacity retention rates of the 100th cycle discharge capacity with respect to the 1st cycle discharge capacity of the charged and discharged lithium secondary batteries after performing 100 cycles of charging-and-discharging at a 1C charge rate and a 1C discharge rate of lithium secondary batteries according to Examples 1 to 3 and Comparative Examples 1 to 6.
Figure 6B:
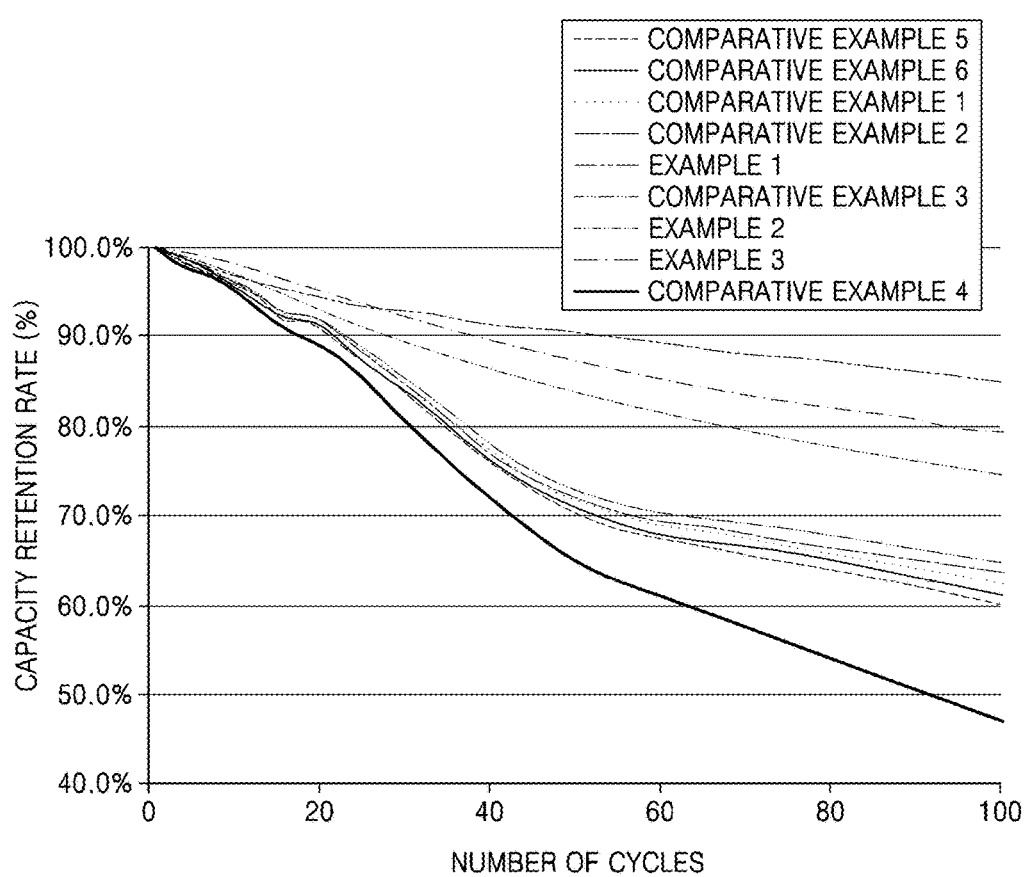
FIG. 6B is a graph showing capacity retention rates of the 100th cycle discharge capacity with respect to the 1st cycle discharge capacity of the charged and discharged lithium secondary batteries after performing 100 cycles of charging-and-discharging at a 1C charge rate and a 3C discharge rate of lithium secondary batteries according to Examples 1 to 3 and Comparative Examples 1 to 6.
Figure 6C:
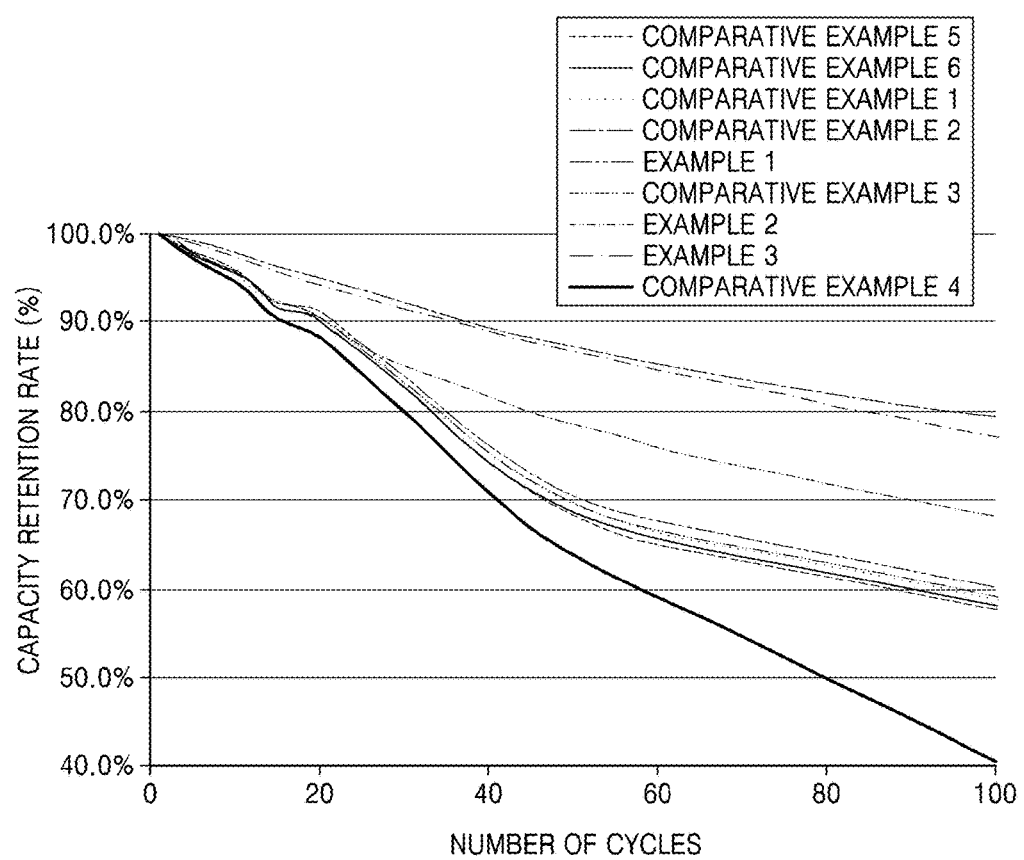
FIG. 6C is a graph showing capacity retention rates of the 100th cycle discharge capacity with respect to the 1st cycle discharge capacity of the charged and discharged lithium secondary batteries after performing 100 cycles of charging-and-discharging at a 1C charge rate and a 7C discharge rate of lithium secondary batteries according to Examples 1 to 3 and Comparative Examples 1 to 6.

Referring to Tables 3 to 5 and FIGS. 6A to 6C, the lithium secondary batteries according to Examples 1 to 3 had a capacity retention rate of about 84.8% or higher of the 100th cycle capacity with respect to 1st cycle capacity after charging and discharging the lithium secondary batteries 100 times at a 1C charge rate and a 1C discharge rate, the lithium secondary batteries according to Examples 1 to 3 had a capacity retention rate of about 74.6% or higher at the 100th cycle capacity with respect to 1st cycle capacity after charging and discharging the lithium secondary batteries 100 times at a 1C charge rate and a 3C discharge rate, and the lithium secondary batteries according to Examples 1 to 3 had a capacity retention rate of about 68.1% or higher at the 100th cycle capacity with respect to 1st cycle capacity after charging and discharging the lithium secondary batteries 100 times at a 1C charge rate and a 7C discharge rate.

Hereby, it can be confirmed that the lithium secondary batteries according to Examples 1 to 3 are excellent even at high-rate lifetime characteristics of the 1C charge and 3C discharge and the 1C charge and 7C discharge.

As described above, according to the one or more of the above exemplary embodiments, the present disclosure may provide a secondary battery with improved electronic conductivity and lifetime characteristics by including a negative electrode including a negative electrode active material including: an Si—Fe based alloy core; an amorphous carbonaceous first coating layer disposed on the core; and a second coating layer which is disposed on the first coating layer and includes carbon nanotubes (CNTs) having an average length of about 1.0 nm to about 2.0 μm.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

In the present disclosure, the terms "Example," "Comparative Example," "Reference Example" "Manufacture Example," "Comparative Manufacture Example," "Reference Manufacture Example" and "Evaluation Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:
1. A secondary battery comprising:
a negative electrode, a positive electrode, and an electrolyte between the negative electrode and the positive electrode,
wherein the negative electrode comprises a negative electrode active material comprising: an Si—Fe based alloy core;
wherein the Si—Fe based alloy core comprises an Si—Fe based alloy represented by Formula 1:

$$Si_x\text{—}Fe_y\text{-}M_z \quad \text{[Formula 1]}$$

wherein $50 \leq x \leq 90$, $5 \leq y \leq 30$, $5 \leq z \leq 30$, $x+y+z=100$; and M is selected from C, Mg, S, Se, Te, Sn, In, Ga, Ge, As, Pb, Pd, Bi, Zn, and Ag;
an amorphous carbonaceous first coating layer disposed on the core; and a second coating layer which is disposed on the first coating layer and comprises carbon nanotubes (CNTs) having an average length of about 1.0 nm to about 2.0 μm.

2. The secondary battery of claim 1, wherein the carbon nanotubes are contained in a range of about 0.1 part by weight to about 5.0 parts by weight with respect to 100 parts by weight of the negative electrode active material.

3. The secondary battery of claim 1, wherein the amorphous carbonaceous first coating layer is contained in a range of about 0.1 parts by weight to about 5.0 parts by weight with respect to 100 parts by weight of the negative electrode active material.

4. The secondary battery of claim 1, wherein the Si—Fe based alloy core is in the form of powder, and the powder has a D50 value of about 0.3 μm to about 20 μm.

5. The secondary battery of claim 1, wherein the Si—Fe based alloy core powder has an electronic conductivity of about 0.35 S/cm to about 5.0 S/cm at a powder density of about 2.1 g/cc to about 2.5 g/cc.

6. The secondary battery of claim 1, wherein the positive electrode comprises a positive electrode active material represented by Formula 2:

$$Li_xNi_{1-y}M'_yO_{2-z}X_z \quad \text{[Formula 2]}$$

wherein M' is one or more selected from Co, Al, Mn, Mg, Cr, Fe, Ti, Zr, and Mo; X is one selected from O, F, S, and P; and $0.9 \leq x \leq 1.1$, $0 < y \leq 0.5$, and $0 \leq z \leq 2$.

7. The secondary battery of claim 1, wherein the positive electrode comprises a positive electrode active material represented by Formula 3:

$$Li_xNi_{1-y'-y''}Co_{y'}Al_{y''}O_2 \quad \text{[Formula 3]}$$

wherein $0.9 \leq x \leq 1.1$, $0 < y'+y'' \leq 0.2$, and $0 \leq y' \leq 0.1$.

8. The secondary battery of claim 1, wherein the positive electrode comprises a positive electrode active material selected from a group consisting of $LiNi_{0.8}Co_{0.15}Al_{0.05}O_2$ and $LiNi_{0.6}Co_{0.2}Mn_{0.2}O_2$.

9. The secondary battery of claim 1, wherein a capacity retention rate of the secondary battery at the 100th cycle capacity with respect to the 1st cycle capacity after charging and discharging the secondary battery 100 times at a 1C charge rate and at a 3C discharge rate is about 73% or higher.

10. The secondary battery of claim 1, wherein a capacity retention rate of the secondary battery at the 100th cycle capacity with respect to the 1st cycle capacity after charging and discharging the secondary battery 100 times at a 1C charge rate and at a 7C discharge rate is about 65% or higher.

11. A negative electrode comprising:
a negative electrode active material comprising: an Si—Fe based alloy core;
wherein the Si—Fe based alloy core comprises an Si—Fe based alloy represented by Formula 1:

$$Si_x\text{—}Fe_y\text{-}M_z \quad \text{[Formula 1]}$$

wherein $50 \leq x \leq 90$, $5 \leq y \leq 30$, $5 \leq z \leq 30$, $x+y+z=100$; and M is selected from C, Mg, S, Se, Te, Sn, In, Ga, Ge, As, Pb, Pd, Bi, Zn, and Ag;

an amorphous carbonaceous first coating layer disposed on the core; and a second coating layer which is disposed on the first coating layer and comprises carbon nanotubes (CNTs) having an average length of about 1.0 nm to about 2.0 μm.

12. The negative electrode of claim 11, wherein the carbon nanotubes may have an average diameter range of about 1.0 nm to about 30 nm.

13. The negative electrode of claim 11, wherein the carbon nanotubes are contained in a range of about 0.1 part by weight to about 5.0 parts by weight with respect to 100 parts by weight of the negative electrode active material.

14. The negative electrode of claim 11, wherein the amorphous carbonaceous first coating layer is contained in a range of about 0.1 parts by weight to about 5.0 parts by weight with respect to 100 parts by weight of the negative electrode active material.

15. The negative electrode of claim 11, wherein the Si—Fe based alloy core is in the form of powder, and the powder has a D50 value of about 0.3 μm to about 20 μm.

16. The negative electrode of claim 11, wherein the Si—Fe based alloy core powder has an electronic conductivity of about 0.35 S/cm to about 5.0 S/cm at a powder density of about 2.1 g/cc to about 2.5 g/cc.

* * * * *